United States Patent
Thornhill et al.

(10) Patent No.: US 11,178,025 B1
(45) Date of Patent: Nov. 16, 2021

(54) AUTOMATED INCIDENT PRIORITIZATION IN NETWORK MONITORING SYSTEMS

(71) Applicant: International Business Machines Corporation, Armonk, NY (US)

(72) Inventors: Matthew Richard James Thornhill, London (GB); Jonathan Ian Settle, Dursley (GB); Ian Manning, Chruch Hill (IE); Paul Basil French, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/994,828

(22) Filed: Aug. 17, 2020

(51) Int. Cl.
  *H04L 12/00* (2006.01)
  *H04L 12/24* (2006.01)
  *G06F 40/279* (2020.01)

(52) U.S. Cl.
  CPC .......... *H04L 41/507* (2013.01); *G06F 40/279* (2020.01); *H04L 41/5019* (2013.01); *H04L 41/5054* (2013.01)

(58) Field of Classification Search
  CPC .............. H04L 41/507; H04L 41/5079; H04L 41/5054; G06F 40/279
  USPC ........................................................ 709/223
  See application file for complete search history.

(56) References Cited

U.S. PATENT DOCUMENTS

| | | | |
|---|---|---|---|
| 9,432,393 B2 * | 8/2016 | Bartos | G06F 16/285 |
| 9,595,184 B2 * | 3/2017 | Almansour | H04L 63/123 |
| 9,786,162 B2 * | 10/2017 | Blandin | H04L 67/12 |
| 10,972,333 B2 * | 4/2021 | Farrell | H04L 41/069 |
| 2015/0121518 A1 * | 4/2015 | Shmueli | H04L 63/1425 726/22 |
| 2019/0081851 A1 * | 3/2019 | Farrell | H04L 41/064 |
| 2019/0158366 A1 | 5/2019 | Higgins | |
| 2019/0207969 A1 * | 7/2019 | Brown | G06F 21/552 |
| 2020/0021503 A1 | 1/2020 | De Lima | |

OTHER PUBLICATIONS

"How to Use Customer Feedback Analytics to Improve Customer Experience", SAP, Mar. 16, 2017, 8 pps., <https://www.sapanalytics.cloud/resources-customer-feedback-analytics/>.

(Continued)

*Primary Examiner* — Frantz Coby
(74) *Attorney, Agent, or Firm* — David K. Mattheis; Maeve M. Carpenter

(57) ABSTRACT

Aspects of the present invention disclose a method for automated incident prioritization in network monitoring systems. The method includes one or more processors determining historical sentiment impact scores for one or more incident parameters based at least in part on textual content of customer feedback and changes of a customer sentiment during a time period corresponding to one or more system incidents of the time period. The method further includes assigning a classification to the one or more system incidents, wherein the classification corresponds to the one or more incident parameters. The method further includes determining an active incident sentiment impact score for each of one or more active incidents. The method further includes applying the active incident sentiment impact scores as a factor to prioritize incident handling of the one or more active incidents.

20 Claims, 5 Drawing Sheets

(56) References Cited

OTHER PUBLICATIONS

"Method and System for Analyzing Customer Sentiment in Support to Determine Issue Severity", IP.com No. IPCOM000253282D, IP.com Electronic Publication Date: Mar. 19, 2018, 3 pps.

"Method for Filtering Requests by Feeling", IP.com No. IPCOM000255957D, IP.com Electronic Publication Date: Oct. 25, 2018, 3 pps.

Aljaber, "How to capture and prioritize customer feedback in agile development", Published Dec. 4, 2015 in Inside Atlassian, 6 pps., <https://www.atlassian.com/blog/inside-atlassian/how-to-capture-and-prioritize-customer-feedback-in-agile-development>.

Churchman, "Determining incident priority", Jun. 20, 2017, PagerDuty, 8 pps., <https://www.pagerduty.com/blog/determining-incident-priority/>.

Li et al., "Incident Ticket Analytics for IT Application Management Services", Conference: 2014 IEEE International Conference on Services Computing (SCC), Jun. 2014, 7 pps., <https://www.researchgate.net/publication/286668462_Incident_Ticket_Analytics_for_IT_Application_Management_Services>.

Mell et al., "The NIST Definition of Cloud Computing", National Institute of Standards and Technology, U.S. Department of Commerce, NIST Special Publication 800-145, Sep. 2011, 7 pages.

\* cited by examiner

AUTOMATED INCIDENT PRIORITIZATION IN NETWORK MONITORING SYSTEMS

BACKGROUND OF THE INVENTION

The present invention relates to automated incident prioritization in network monitoring systems, and more specifically, to incident prioritization based on customer feedback sentiment analysis.

When managing an information technology system, an organization will typically employ event and incident management software in order to manage the fixing of faults that occur. When faults occur within the system, events are generated by monitoring systems and the event management software is responsible for collating these events and presenting it to the user. For customer-impacting faults, which may cause multiple events, incident management software can aid the organization in managing the workflow required to resolve the issue. Customers often have multiple incidents and so prioritization is necessary. Knowing which topics are "hot" or sensitive to customers and addressing them so that they are less likely to reoccur improves a customer's perception of the service.

An emerging trend in the incident management domain is the Service Reliability Engineer (SRE) role, which positions a person with strong software engineering skills somewhere between traditional operations and the development teams. As with a traditional operations role, it is their responsibility to rapidly resolve incidents when they occur, but they are also expected to spend at least half of their time preventing future occurrences of incidents. This incident prevention can take multiple forms, but will typically involve directly contributing code or automations to the services involved.

Another mechanism is through use of Net Promoter Score (NPS), a randomized population of users are asked how likely they would be to recommend the product to another user and are invited to add a comment to qualify their answer. This gives the organization a quantitative way to measure their users' sentiment towards their product, backed up with the qualitative comments. In addition to the use of NPS, an organization may also use other more qualitative sources to understand sentiment and may use analytics to derive a measurable quantity.

SUMMARY

Aspects of the present invention disclose a method, computer program product, and system for automated incident prioritization in network monitoring systems. The method includes one or more processors determining historical sentiment impact scores for one or more incident parameters based at least in part on textual content of customer feedback and changes of a customer sentiment during a time period corresponding to one or more system incidents of the time period. The method further includes one or more processors assigning a classification to the one or more system incidents, wherein the classification corresponds to the one or more incident parameters. The method further includes one or more processors determining an active incident sentiment impact score for each of one or more active incidents based at least in part on classifications of each of the one or more active incidents as one or more incident parameters and the historical sentiment impact score for the one or more incident parameters. The method further includes one or more processors applying the active incident sentiment impact scores as a factor to prioritize incident handling of the one or more active incidents.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Preferred embodiments of the present invention will now be described, by way of example only, with reference to the drawings.

DETAILED DESCRIPTION

Embodiments of the present invention allow for automated incident prioritization in network monitoring systems. Embodiments of the present invention analyze changes to customer sentiment over time and use the reasons for that sentiment delta to prioritize current incidents. Additional embodiments of the present invention match current incident parameters to historical incident parameters for which a change in sentiment is known and quantified. Various embodiments of the present invention recognize organizations attempt to measure current customer sentiment towards products and service utilizing analytics to mine sources of data such as social media to understand customer sentiment and metricize customer sentiment so that the customer sentiment can be monitored. For example, analyzing social media posts mentioning a product and using sentiment analysis to produce a score of an author's sentiment towards the product.

Some embodiments of the present invention recognize that a change in customer sentiment in feedback for a service provides a quantitative measure of the impact of an issue to a given customer. There is therefore utility in being able to predict the change in customer sentiment and therefore the customer impact in order to help with prioritization of incident and problem resolution. Additionally, embodiments of the present invention recognize that the impact to a customer can be difficult to measure and is typically a role of a Service Reliability Engineer (SRE) determine priority based on prior experience of the SRE. However, providing a more quantitative measure of the impact a given incident would have on a customer, both during incident resolution and problem resolution to the SRE would be beneficial. Allowing the SRE to more accurately prioritize a workload, ultimately leading to a better experience for customers.

For example, in aspects of an SRE's role, the SRE will need to be able to prioritize workload. In this example, when multiple incidents occur, the SRE needs to determine incidents that have the most impact on the customer or set of customers due to shared infrastructure. Various embodiments of the present invention can operate to increase the efficiency of network monitoring systems by automatically identifying high priority incidents that impact network clients.

Figure 1:
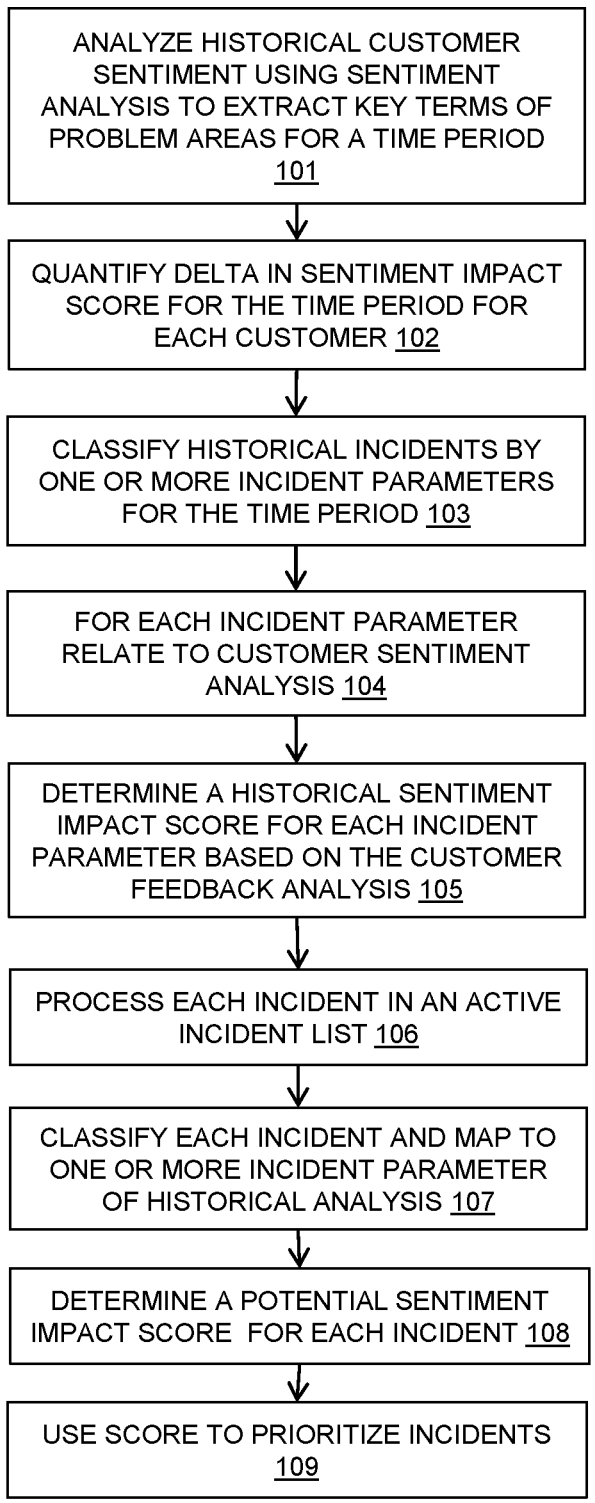
FIG. 1 is a flow diagram depicting operational steps of an example embodiment of a method, in accordance with an embodiment of the present invention.

Referring to FIG. 1, a flow diagram 100 shows an example embodiment of operational steps of the described method. A computer-implemented method is described for automated incident prioritization in network monitoring systems.

Historical data is first analyzed to determine historical mappings of sentiment impact scores to incident parameters based on analysis of changes in customer feedback sentiment over an historical time period is mapped to incidents in the same period that are classified by incident parameters. The incident parameters may include: incident application types, incident problem types, geographical location of incidents, time of day of incidents, and other forms of common factor of incidents.

For a specific time period, historical customer sentiment reports are analyzed 101 using sentiment analysis to extract sentiment key terms in the form of words or phrases and to evaluate a change in sentiment of the customer over the time period. Customer sentiment reports may be in the form of Net Promoter Score (NPS) data, social media comments, or other feedback data provided by a customer. Customer feedback may be analyzed using natural language processing to obtain sentiment analysis to extract key terms from the customer feedback and to quantify a sentiment change over the time period.

Sentiment analysis may be used to generate a score, for example, between zero (0) and one (1), where zero (0) is a negative sentiment including strong dislike/bad/hate words, and a score of one (1) is positive including happy/thankful words. Scores in between may be mixed or neutral. A change or delta in sentiment is quantified 102 for inclusion in a customer sentiment impact score for that period for each customer.

The generated score based on feedback may be a contributing factor to a broader formula for customer sentiment impact scores taking into account other aspects. The other aspects may include one or more of the following. The customer sentiment impact scores may be weighted for customers according to customer information, such as level of revenue or importance of a customer. For example, a small impact on a large revenue generating client may be a higher priority than a large sentiment change for a small client. The customer sentiment impact score may be adapted based on a number of times that the customer complained during the time period in question, or during previous time period. The customer sentiment impact score may be adapted by a trend of scores for a customer over previous deltas. For example, if this is the third time in a row that sentiment has decreased for a customer, this may weigh the current score more highly.

The customer feedback over the time period may relate to more than one issue and sentiment analysis may result in more than one score for the customer in the time period relating to different issues.

Historical incidents in the same time period may be classified 103 into incident parameters on a number of dimensions. The incident parameters may include the following: incident problem type, incident application type, incident cause, node location, time, etc.

In monitoring systems, alerts are received that follow standard formats including common fields such as:

Event type (problem type: latency, jitter, throughput, communications failure, etc.);
Application type;
Probable cause (reason: congestion, corrupt data, bandwidth reduction, etc.);
Node (where it happened); and
Time.

The fields can be used to classify the incidents by the parameters. For example, the parameter of "incident problem type", "incident application type", and "incident cause" may classify incidents by the key problem areas, the key application areas, or possible incident cause respectively based on the textual content of the contained event fields. This textual content may be compiled as descriptors of the incident problem types and incident application types that may be used later to match to the customer feedback.

The parameter of "node location" may classify incidents by a location in which the events occurred and the parameter of "time" may classify incidents by a time of day or time slot within the overall time period being analyzed for historical incidents.

For each classified historical incident parameter obtained in the preceding step, the method may relate 104 the incident parameter to the issues on which the customer feedback is based. This may be determined as a result of the customer sentiment analysis and keyword analysis and/or other information provided in relation to the feedback such as a location of the person providing the feedback and the time of the feedback.

The sentiment analysis of the customer feedback may extract words and phrases relating to the alert fields above. This may be achieved by matching key terms extracted from the customer feedback with the descriptors of the incident types. As mentioned above, a single feedback report or message may relate to more than one issue and these may be classified by different incident parameters.

The geographical location of the customer feedback may be compared to the geographical location of the historical incidents to further relate the feedback to the incidents that have occurred in the time period. Geographic regions or locations may be extracted from from the feedback from NPS or social media or may be based on the address of the person who provided the feedback.

The time of the customer feedback within the time period may also be used to relate the feedback to the incidents that have occurred in the time period. This may be based on the time of the feedback or references in the feedback to issues at certain times, such as "morning" or "evening".

A historical sentiment impact score may be determined 105 for each incident parameter. This creates a mapping between each incident parameter and sentiment delta. The potential sentiment impact scores of incident parameter may be based on combined customer sentiment impact scores of multiple customer feedback reports in the time period mapped to the incident parameter.

The historical sentiment impact scores of incident parameters may be additions of customer impact scores that are mapped to the incident parameter and the scores may be weighted due to a number of historical incidents of the incident parameter in the time period.

for that period for each customer. The customer sentiment reports are also analyzed to identify references to key problem areas and other information that can be used to identify one or more issues to which the reports relate.

This historical analysis is typically performed when new sentiment reports are received from customers. Table 1 below shows an example of the results of such an analysis.

TABLE 1

Customer Sentiment Delta Analysis

| Cus | Rev | Prev Score | Date | Score | Date | Delta | Non-tech | Prob. Type | App/Serv | Loc. |
|-----|-----|------------|-------|-------|-------|-------|------------------|--------------------|---------------|--------|
| A   | 20  | 7.5        | 01.19 | 7.1   | 07.19 | −0.4  |                  | Latency            | Voice         | London |
| B   | 5   | 8.5        | 01.19 | 8.2   | 07.19 | −0.3  |                  | Slow through put   | Data Video    | London |
| C   | 100 | 8.5        | 01.19 | 8.4   | 07.19 | −0.1  | operations       | MTTR               |               | N/A    |
| D   | 500 | 8.5        | 01.19 | 8.6   | 07.19 | 0.1   | customer service |                    |               | N/A    |
| E   | 10  | 8.5        | 01.19 | 8     | 07.19 | −0.5  |                  | Latency            | Voice         | Leeds  |

The method may process an active incident list based on the historical sentiment impact scoring of the historical data. Each incident in the active incident list is processed 106 and each incident is classified 107 by one or more incident parameters of the historical analysis. A potential sentiment impact score may be determined 108 for each incident based on the score of the classified historical incident parameters.

The potential sentiment impact score of the active incidents is used 109 to prioritize which incident or group of incidents in the current list to handle first. An active incidents list may be periodically evaluated to obtain the sentiment impact scores and to prioritize incident handling.

For a specific period of time, the method computes historically based on customer feedback: Reference (from feedback)<->Delta in Sentiment. The reference may be the problem type, location, time, etc.

For the same period, the method analyses all events/incidents received in a monitoring system to compute: Incident Parameter<->Reference (from incidents).

Using these two mappings together the method maps: Incident Parameter<->Sentiment Impact Score.

In a real time incident monitoring system, incoming events/incidents are classified by one or more Incident Parameter and the above mapping is used to relate the Incident Parameter to a Sentiment Impact Score.

As an example, a first case may quantify a Sentiment Impact Score by an incident parameter of Problem Type, for example, Latency. In another case, a Sentiment Impact Score may be on another incident parameter, for example, Location. Combinations of incident parameter are also possible providing more than one dimension, such as "Latency problems in Leeds". A Sentiment Impact Score may be provided for historical "Latency problems in Leeds" and an active incident that is classified by parameters as a "Latency problem in Leeds" can look up a potential Sentiment Impact Score and be prioritized accordingly compared to other parameter combinations such as "Communications Failure in Leeds" or "Latency in London".

An example embodiment is described in further detail below. Historical customer sentiment feedback reports, for example, from NPS comments or social media comments, are classified using sentiment analysis into sentiment keywords or phrases for calculating the delta in sentiment score There is a row for each customer, anonymized here as customers A-E. Customer information may be provided containing relevant customer information such as, for example, name, annual revenue, etc. The column "Rev" indicates an example revenue. Sentiment scores are shown with a previous score at a given date and later score at a given date. This allows a delta in sentiment score to be determined for the time period.

For simplicity in this example, there is one row per customer assuming that the delta in NPS is attributed to one issue, for example, "The reason my delta NPS score is −0.4 is due Latency problems in my Voice app in London".

However, the customer may also have said that "The Video streaming service in Leeds is fantastic" or "gaming app is poor after 10 PM". Such multiple issues may be accommodated by analysis of the customer sentiment report and accommodated with multiple rows per customer.

Sentiment analysis is performed on the customer's comments and sentiment terms in the form of keywords or phrases are distilled from this analysis. The purpose of this analysis is to distil terms which (a) give insight into the current sentiment of the customer and (b) why it may have changed since over the last period. These sentiment terms can be split into different categories for simplicity. Examples of these categories include but are not limited to: non-technical, problem type, and type of application or service. Additional information may also be captured such as a location of the customer.

In Table 1, each row in the Customer Sentiment Delta Analysis shows a customer's delta in sentiment over a period of time on a number of dimensions including Problem Type, Application/Service, Location. More dimensions may be added such as time of day. Non-technical terms are shown as: operations, customer service. Problem types are shown as: latency, slow throughput, mean time to repair (MTTR). Types of application or service are shown as: voice, data.

Historical incidents are classified into incident parameters including for example key problem areas based on the textual content of the contained event's fields for the same time period.

This involves analyzing the incidents that occurred during the period that the customer sentiment reports relate to. The purpose of the incident analysis is to aid in the determination of what incidents affected customer sentiment during the time period. The analysis includes examining each event in the incident to distil keywords similar to the keywords obtained from the sentiment analysis shown in Table 1, for example, non-technical, application/service, problem type. These are just examples and other categories and keywords may also be determined.

For each classified historical incident parameter obtained from the analysis of historical incidents, the incident parameter is related to the problem areas determined as a result of the customer sentiment analysis in order to infer a Sentiment Impact Score (SIS) for that incident parameter. This creates a mapping between each incident parameter and sentiment delta as shown in Table 2 below.

TABLE 2

Historical Sentiment Impact Analysis

| Period | No. Incid | Name | App/Serv | Prob. type | Location | Node | Severity | SIS |
|---|---|---|---|---|---|---|---|---|
| Jan-Jul 19 | 10 | Voice quality Issue | Voice | Latency threshold breach | London | C7506_1 | Critical | −0.9 |
| Jan-Jul 19 | 5 | Slow video | Video | Through put breach | NY | IPTV23 | Critical | −0.3 |
| Jan-Jul 19 | 2 | Custom care | Custom care issue | Slow response | Sydney | Tkt_2345 | Critical | −0.1 |
| Jan-Jul 19 | 3 | Video issue | Video | Pixilation | Milan | ABY_34 | Critical | 0.1 |

A mapping can be determined between the classified incidents and the customer sentiment analysis by comparing the problem areas or other parameters which are common between the two classifications.

In this example, a Sentiment Impact Score is quantified by Problem Type, i.e. Latency as in Table 1 above (row A, row E). The same algorithm may be used to compute a Sentiment Impact Score on another dimension, for example, all problems in London; the incident parameter may be the Location dimension (row A, row B). Combinations of dimensions are also possible, such as "Latency problems in Leeds".

The aggregated delta in sentiment scores may be used to infer a historical sentiment impact score. For example, in Table 1, both customer A and customer E indicated that they had latency problems with their voice service since the last survey and as a result both of their sentiment scores dropped. The combined change to their sentiment scores was −0.9 during that time (−0.4 for customer A and −0.5 for customer E).

In Table 2 which represents the results of the historical incident analysis, it can be seen that 10 incidents relating to the voice service occurred with a problem type of latency threshold breach.

Using a mapping between the two analyses, it can be inferred that the drop in sentiment analysis can be associated with these incidents. Therefore, a Sentiment Impact Score (SIS) of −0.9 is assigned to incidents of this type.

The Sentiment Impact Scores for incident parameters, in this example incident types, can be used to enrich current incidents in an incident list in order to aid in the prioritization of work. Periodically, for each incident in an active incident list, the Sentiment Impact Scores are evaluated so that the handling of incidents can be prioritized.

Each incident in an active incident list may be classified and mapped it to one or more incident type in the historical incident sentiment impact analysis above in order to determine a potential Sentiment Impact Score for each active incident.

Table 3 below shows a sample Active Incident List. Common fields are provided such as: date, service name, incident identifier, number of events contained in the incident, summary, and an overall severity. In this example, the severity of all incidents is deemed critical. A Service Reliability Engineer (SRE) looking at this list may not know which one to work on first.

TABLE 3

Active Incident List

| Date | Service | Incident ID | No. of Events | Summary | Severity |
|---|---|---|---|---|---|
| Jul. 20, 2019 18:59 | Video | 634 | 5 | Threshold breach; Latency | Critical |
| Jul. 20, 2019 18:59 | Video | 324 | 4 | Threshold breach; Throughput | Critical |
| Jul. 20, 2019 18:59 | Cloud | 356 | 1 | Pixilation | Critical |
| Jul. 20, 2019 18:59 | Cloud | 356 | 1 | Storage | Critical |

Table 4 below shows the Active Incident List following the mapping analysis, showing the determined Sentiment Impact Score. It can be seen that a mapping was not found for all incidents. However, for those for which a mapping was found, the SRE can use the SIS score to prioritize the incidents, in this case, Incident 634 that has an SIS score of −0.9. An SRE may alternatively prioritize on the most positive score, i.e. Incident 356 in the example, i.e. make happy customers happier.

TABLE 4

Active Incident List with mapped Sentiment Impact Score

| Date | Service | Incident ID | No. of Events | Summary | Severity | SIS |
|---|---|---|---|---|---|---|
| 20 Jul. 2019 18:59 | Video | 634 | 5 | Threshold breach; Latency | Critical | −0.9 |
| 20 Jul. 2019 18:59 | Video | 324 | 4 | Threshold breach; Throughput | Critical | −0.3 |
| 20 Jul. 2019 18:59 | Cloud | 356 | 1 | Pixilation | Critical | 0.1 |
| 20 Jul. 2019 18:59 | Cloud | 356 | 1 | Storage | Critical | No match |

The delta in sentiment score may not be the only factor used in the computation of the sentiment score. For example, the annual revenue of a customer could be used as a weighting mechanism as well as a frequency of feedback and/or the sentiment of previous feedback.

Different weightings may also be applied to the prioritization in addition to the SIS score. Further extrapolation may also be carried out based on the likelihood of additional customers to have the same sentiment, but did not provide feedback, in order to aid prioritization.

The method relates changes in customer sentiment to specific network or service problem areas in order to prioritize the handling of the incidents to minimize customer dissatisfaction or to maximize customer satisfaction.

The method combines analysis of changes to customer sentiment over time with analysis of received incidents over that same period in order to provide inference data as to why the sentiment may have changed. It then uses this analysis, to allow mapping in a live system. Live, incoming incidents into the network monitoring system can then be classified into specific problem areas and the live incident related to a potential sentiment impact based on the historical sentiment analysis.

Figure 2:
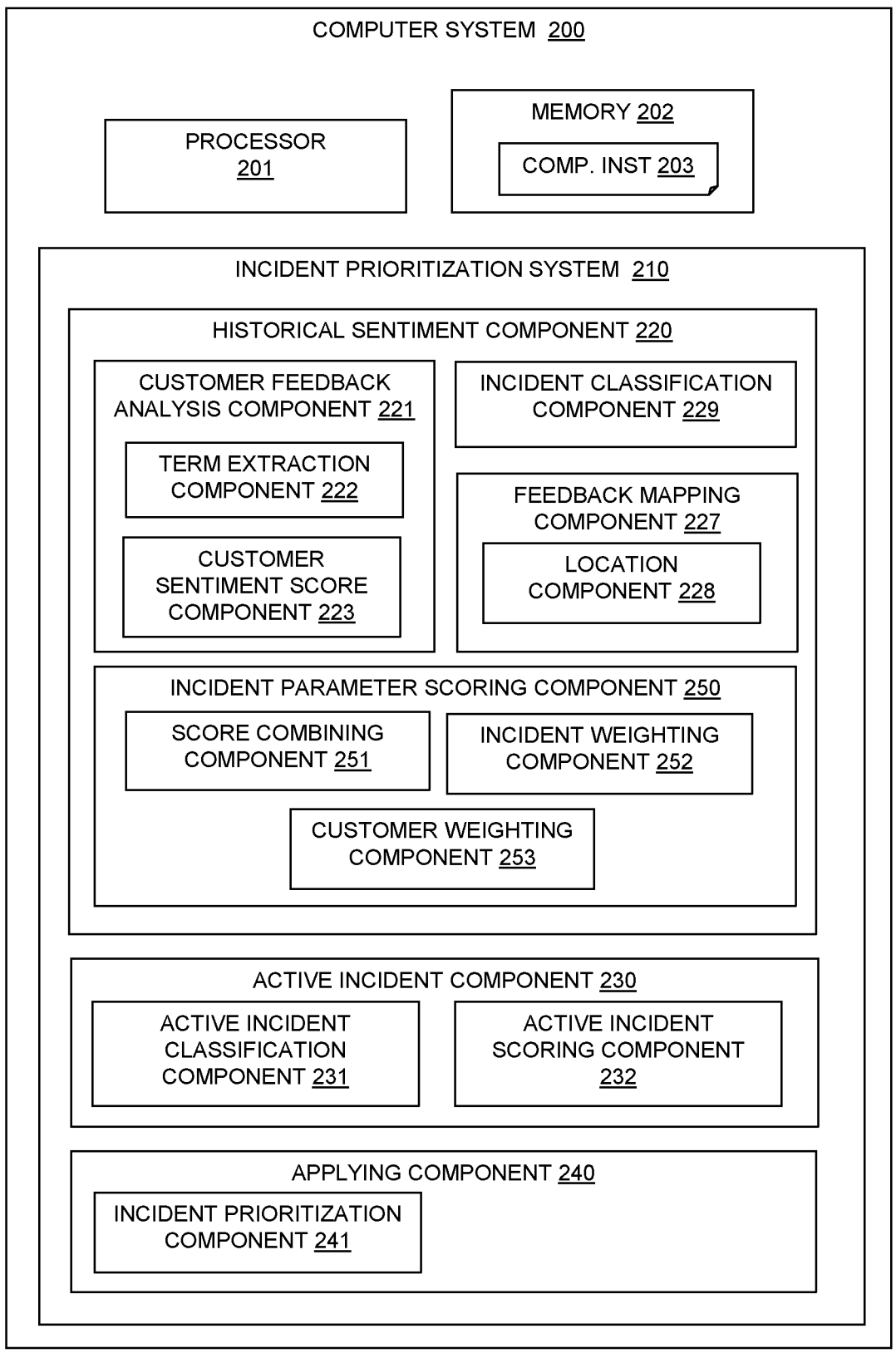
FIG. 2 is a functional block diagram of an example embodiment of a data processing environment system, in accordance with an embodiment of the present invention.

Referring to FIG. 2, a block diagram shows an example embodiment of computer system 200 including incident prioritization system 210. Incident prioritization system 210 may be provided as part of an incident handling system for a network monitoring system. Additionally, FIG. 2 includes a block diagram of components of incident prioritization system 210 of FIG. 2, which perform operational steps of the described method in FIG. 1, in accordance with an embodiment of the present invention. It should be appreciated that FIG. 2 provides only an illustration of one implementation and does not imply any limitations with regard to the environments in which different embodiments may be implemented. Many modifications to the depicted environment may be made.

The present invention may contain various accessible data sources that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Incident prioritization system 210 enables the authorized and secure processing of personal data. Incident prioritization system 210 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Incident prioritization system 210 provides information regarding personal data and the nature (e.g., type, scope, purpose, duration, etc.) of the processing. Incident prioritization system 210 provides the user with copies of stored personal data. Incident prioritization system 210 allows the correction or completion of incorrect or incomplete personal data. Incident prioritization system 210 allows the immediate deletion of personal data.

Computer system 200 includes at least one instance of processor 201, a hardware module, or a circuit for executing the functions of the described components which may be software units executing on processor 201. Multiple processors running parallel processing threads may be provided enabling parallel processing of some or all of the functions of the components. Memory 202 may be configured to provide computer instructions 203 to processor 201 to carry out the functionality of the components.

Incident prioritization system 210 can include historical sentiment component 220 that determines historical sentiment impact scores for incident parameters based on historical analysis of customer feedback and changes in customer sentiment over a time period mapped to incidents in the same period that are classified by incident parameters.

Historical sentiment component 220 can include customer feedback analysis component 221 for analyzing the customer feedback using natural language processing, which includes term extraction component 222 that extracts key terms from the customer feedback and customer sentiment score component 223 that obtains sentiment analysis to quantify a sentiment change over the time period as a customer sentiment impact score.

Historical sentiment component 220 can include incident classification component 229 that classifies historical incidents in the time period into incident parameters. The classified historical incidents may be based on the textual content of the contained event fields and the textual content may be compiled as descriptors of the incident parameters.

Historical sentiment component 220 can include feedback mapping component 227 that maps customer feedback to incident parameters by relating extracted terms from the customer feedback and other information associated with the customer feedback to descriptors of incident parameters. Feedback mapping component 227 can include location component 228 that uses locations of customer feedback and locations of incidents in the time period for the mapping of customer feedback to incident parameters.

Historical sentiment component 220 can include incident parameter scoring component 250 for generating the historical sentiment impact scores for incident parameters. Incident parameter scoring component 250 can include score combining component 251 that combines customer sentiment impact scores of customer feedback mapped to incidents of the incident parameter to provide the historical sentiment impact scores for an incident parameter.

Incident parameter scoring component 250 can also include incident weighting component 252 for weighting the historical sentiment impact scores for incident parameters based on a number of historical incidents of the incident parameter in the time period and can include customer weighting component 253 for weighting a customer sentiment impact score.

Incident prioritization system 210 can include active incident component 230 that obtains an active incident sentiment impact score for each of a plurality of active incidents. Active incident component 230 can include active incident classifying component 231 that classifies each active incident as one or more incident parameter and active incident scoring component 232 that uses the historical sentiment impact score for the one or more incident parameters to generate an active sentiment impact score for the active incident.

Incident prioritization system 210 can include applying component 240 that applies the active incident sentiment impact scores. Applying component 240 can include incident prioritization component 241 that prioritizes incident handling. Applying component 240 can periodically evaluate a plurality of active incidents to obtain the active incident sentiment impact scores and to prioritize incident handling.

The described system may be applied in a customer trouble ticketing systems. Changes in sentiment relating to a particular problem or problem area are analyzed and related to previous tickets in that time period classified to specific problems or problem areas. When a new ticket comes in, a potential sentiment impact to fixing that ticket may be determined and the ticket then prioritized accordingly.

Figure 3:
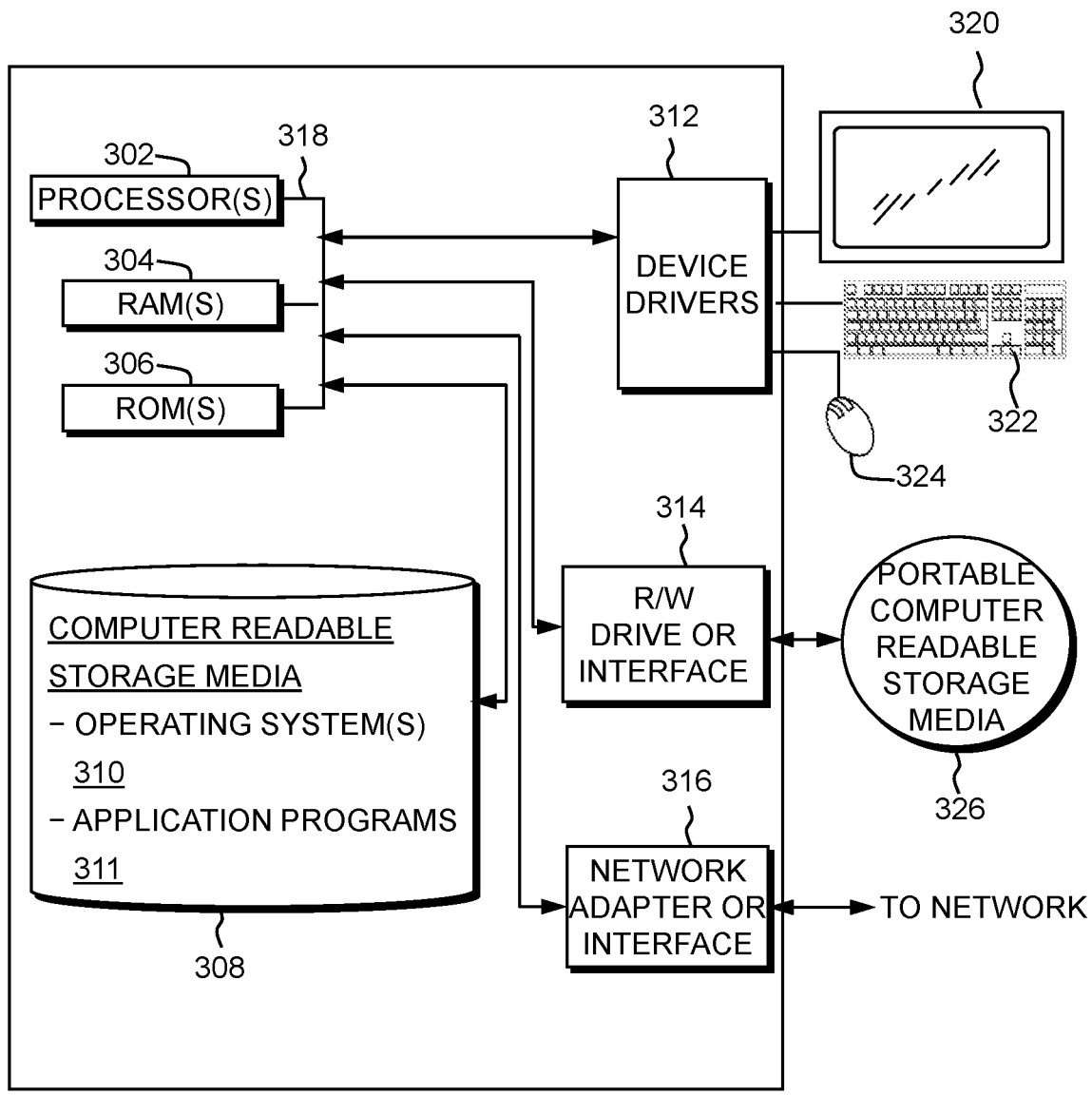
FIG. 3 is a block diagram of an embodiment of a computer system or cloud server in which the present invention may be implemented, in accordance with an embodiment of the present invention.

FIG. 3 depicts a block diagram of components of the computing system 200 of FIG. 2, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing system 200 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310, and application programs 311, such as incident prioritization system 210 are stored on one or more of the computer readable storage media 308 for execution by one or more of the processors 302 via one or more of the respective RAMs 304 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 200 can also include a R/W drive or interface 314 to read from and write to one or more portable computer readable storage media 326. Application programs 311 on computing system 200 can be stored on one or more of the portable computer readable storage media 326, read via the respective R/W drive or interface 314 and loaded into the respective computer readable storage media 308.

Computing system 200 can also include a network adapter or interface 316, such as a TCP/IP adapter card or wireless communication adapter. Application programs 311 on computing system 200 can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computing system 200 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
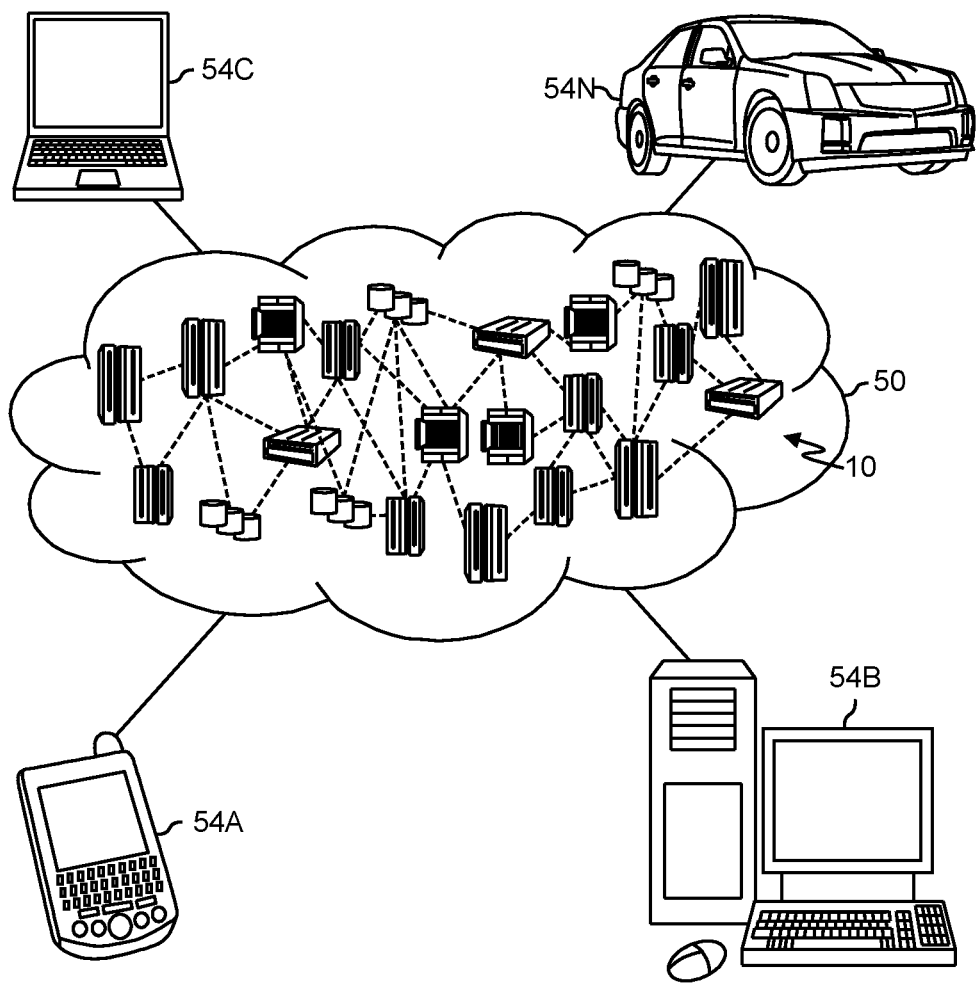
FIG. 4 depicts a cloud computing environment in which the present invention may be implemented, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
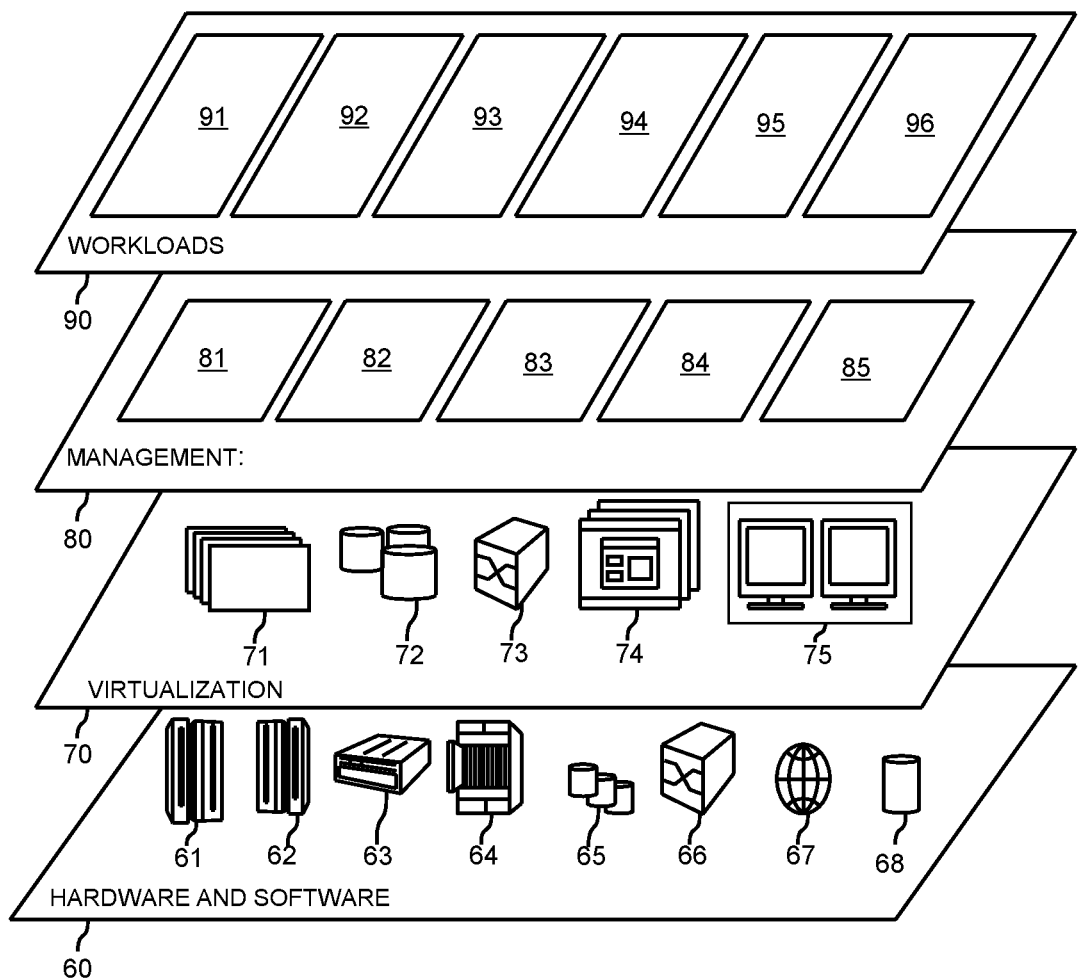
FIG. 5 depicts abstraction model layers of a cloud computing environment in which the present invention may be implemented, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incident prioritization processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for automated incident prioritization in network monitoring systems, the method comprising:
   determining, by one or more processors, historical sentiment impact scores for one or more incident parameters based at least in part on textual content of customer feedback and changes of a customer sentiment during a time period corresponding to one or more system incidents of the time period;
   assigning, by one or more processors, a classification to the one or more system incidents, wherein the classification corresponds to the one or more incident parameters;
   determining, by one or more processors, an active incident sentiment impact score for each of one or more active incidents based at least in part on classifications of each of the one or more active incidents as one or more incident parameters and the historical sentiment impact score for the one or more incident parameters; and
   applying, by one or more processors, the active incident sentiment impact scores as a factor to prioritize incident handling of the one or more active incidents.

2. The method of claim 1, further comprising:
   extracting, by one or more processors, one or more terms of the textual content of the customer feedback associated with the changes in the customer sentiment;
   correlating, by one or more processors, the one or more extracted terms of the customer feedback to one or more descriptors of the one or more incident parameters; and
   mapping, by one or more processors, the customer feedback to the one or more incident parameters based on the correlated one or more extracted terms and the correlated one or more descriptors.

3. The method of claim 1, further comprising:
   extracting, by one or more processors, one or more terms of the textual content of the customer feedback associated with the changes in the customer sentiment using natural language processing; and
   quantifying, by one or more processors, one or more changes of the customer sentiment during the time period in terms of one or more customer sentiment impact scores for the one or more incident parameters.

4. The method of claim 3, wherein determining the historical sentiment impact scores for the one or more incident parameters, further comprises:
   combining, by one or more processors, a customer sentiment impact score for each of the one or more incident parameters based on two or more instance of customer feedback of the time period mapped to each of the one or more incident parameters.

5. The method of claim 1, wherein determining the historical sentiment impact scores for the one or more incident parameters, further comprises:
   assigning, by one or more processors, a weight to a customer sentiment impact score based at least in part on a number of occurrences of a historical incident of an incident parameter during the time period.

6. The method of claim 1, wherein assigning the classification to the one or more system incidents, wherein the classification corresponds to the one or more incident parameters, further comprises:
   classifying, by one or more processors, a historical incident of the time period based on textual data of contained event fields; and
   compiling, by one or more processors, the textual data as a descriptor of the classification of the historical incident corresponding to an incident parameter of the one or more incident parameters.

7. The method of claim 1, further comprising:
   retrieving, by one or more processor, the customer feedback from a plurality of customers; and
   assigning, by one or more processors, a weight to the customer feedback based on customer weightings.

8. The method of claim 1, further comprising:
   mapping, by one or more processors, the customer feedback to the one or more system incidents, wherein the mappings include information corresponding to locations and times of the customer feedback and the one or more system incidents.

9. The method of claim 1, further comprising:
   evaluating, by one or more processors, a plurality of active incidents periodically;
   determining, by one or more processors, an active incident sentiment impact scores for each of the plurality of active incidents; and
   resolving, by one or more processors, each of the plurality of active incidents based on a priority determined by the active incident sentiment impact scores for each of the plurality of active incidents.

10. A computer system for automated incident prioritization in network monitoring systems, the computer system comprising:
    one or more computer processors;
    one or more computer readable storage media; and
    program instructions stored on the computer readable storage media for execution by at least one of the one or more processors, the program instructions comprising:

program instructions to determine historical sentiment impact scores for one or more incident parameters based at least in part on textual content of customer feedback and changes of a customer sentiment during a time period corresponding to one or more system incidents of the time period;

program instructions to assign a classification to the one or more system incidents, wherein the classification corresponds to the one or more incident parameters;

program instructions to determine an active incident sentiment impact score for each of one or more active incidents based at least in part on classifications of each of the one or more active incidents as one or more incident parameters and the historical sentiment impact score for the one or more incident parameters; and program instructions to apply the active incident sentiment impact scores as a factor to prioritize incident handling of the one or more active incidents.

11. The computer system of claim 10, further comprising program instructions, stored on the one or more computer readable storage media for execution by at least one of the one or more processors, to:

extract one or more terms of the textual content of the customer feedback associated with the changes in the customer sentiment;

correlate the one or more extracted terms of the customer feedback to one or more descriptors of the one or more incident parameters; and map the customer feedback to the one or more incident parameters based on the correlated one or more extracted terms and the correlated one or more descriptors.

12. The computer system of claim 10, further comprising program instructions, stored on the one or more computer readable storage media for execution by at least one of the one or more processors, to:

extract one or more terms of the textual content of the customer feedback associated with the changes in the customer sentiment using natural language processing; and quantify one or more changes of the customer sentiment during the time period in terms of one or more customer sentiment impact scores for the one or more incident parameters.

13. The computer system of claim 12, wherein program instructions to determine the historical sentiment impact scores for the one or more incident parameters, further comprise program instructions to:

combine a customer sentiment impact score for each of the one or more incident parameters based on two or more instance of customer feedback of the time period mapped to each of the one or more incident parameters.

14. The computer system of claim 10, wherein program instructions to determine the historical sentiment impact scores for the one or more incident parameters, further comprise program instructions to:

assign a weight to a customer sentiment impact score based at least in part on a number of occurrences of a historical incident of an incident parameter during the time period.

15. The computer system of claim 10, wherein program instructions to assign the classification to the one or more system incidents, wherein the classification corresponds to the one or more incident parameters, further comprise program instructions to:

classify a historical incident of the time period based on textual data of contained event fields; and compile the textual data as a descriptor of the classification of the historical incident corresponding to an incident parameter of the one or more incident parameters.

16. The computer system of claim 10, further comprising program instructions, stored on the one or more computer readable storage media for execution by at least one of the one or more processors, to:

retrieve the customer feedback from a plurality of customers; and assign a weight to the customer feedback based on customer weightings.

17. The computer system of claim 10, further comprising program instructions, stored on the one or more computer readable storage media for execution by at least one of the one or more processors, to:

map the customer feedback to the one or more system incidents, wherein the mappings include information corresponding to locations and times of the customer feedback and the one or more system incidents.

18. The computer system of claim 10, further comprising program instructions, stored on the one or more computer readable storage media for execution by at least one of the one or more processors, to:

evaluate a plurality of active incidents periodically;

determine an active incident sentiment impact scores for each of the plurality of active incidents; and resolve each of the plurality of active incidents based on a priority determined by the active incident sentiment impact scores for each of the plurality of active incidents.

19. A computer program product for automated incident prioritization in network monitoring systems, the computer program product comprising:

one or more computer readable storage media and program instructions stored on the one or more computer readable storage media, the program instructions comprising:

program instructions to determine historical sentiment impact scores for one or more incident parameters based at least in part on textual content of customer feedback and changes of a customer sentiment during a time period corresponding to one or more system incidents of the time period;

program instructions to assign a classification to the one or more system incidents, wherein the classification corresponds to the one or more incident parameters;

program instructions to determine an active incident sentiment impact score for each of one or more active incidents based at least in part on classifications of each of the one or more active incidents as one or more incident parameters and the historical sentiment impact score for the one or more incident parameters; and program instructions to apply the active incident sentiment impact scores as a factor to prioritize incident handling of the one or more active incidents.

20. The computer program product of claim 19, further comprising program instructions, stored on the one or more computer readable storage media, to:

evaluate a plurality of active incidents periodically;

determine an active incident sentiment impact scores for each of the plurality of active incidents; and resolve each of the plurality of active incidents based on a priority determined by the active incident sentiment impact scores for each of the plurality of active incidents.

* * * * *